United States Patent [19]

Plunkett

[11] Patent Number: 4,461,988

[45] Date of Patent: Jul. 24, 1984

[54] APPARATUS FOR CONTROLLING AN ELECTRICAL VEHICLE DRIVE SYSTEM

[75] Inventor: Alan B. Plunkett, Scotia, N.Y.

[73] Assignee: General Electric Company, Schenectady, N.Y.

[21] Appl. No.: 251,603

[22] Filed: Apr. 6, 1981

[51] Int. Cl.³ .............................................. H02P 5/28
[52] U.S. Cl. ..................................... 318/802; 318/805
[58] Field of Search ............................... 318/798–800, 318/801, 802, 803, 805, 810

[56] References Cited

U.S. PATENT DOCUMENTS

| | | | |
|---|---|---|---|
| 3,551,779 | 12/1970 | Campbell | 318/801 X |
| 3,838,322 | 9/1974 | Greenwell | 318/810 |
| 3,899,725 | 8/1975 | Plunkett | 318/227 |
| 4,158,163 | 6/1979 | Eriksen et al. | 318/798 |
| 4,281,276 | 7/1981 | Cutler et al. | 318/810 X |
| 4,322,671 | 3/1982 | Kawada et al. | 318/801 X |

OTHER PUBLICATIONS

Plunkett, A. B., "A Current Controlled PWM Transistor Invertor Drive," IEEE Transactions, 1979, IAS 79:27B, pp. 785–792.

Eisenhaure, David et al., "A High Efficiency Controlled Slip Induction Motor Drive for Electric Vehicles," The Fourteenth Intersociety Energy Conversion Engineering Conf., 8/5/79, p. 627.

Primary Examiner—J. V. Truhe
Assistant Examiner—Patrick C. Keane
Attorney, Agent, or Firm—Marvin Snyder; James C. Davis, Jr.

[57] ABSTRACT

A torque command proportional to accelerator position is provided at low speeds with a transition to a torque command dependent on accelerator pedal position that varies to provide constant horsepower at high speeds. The transition occurs between constant torque command and torque command providing constant power at decreasingly lower speeds with decreasing accelerator pedal position. The torque command provides the control input to a traction motor for an electric vehicle.

5 Claims, 3 Drawing Figures

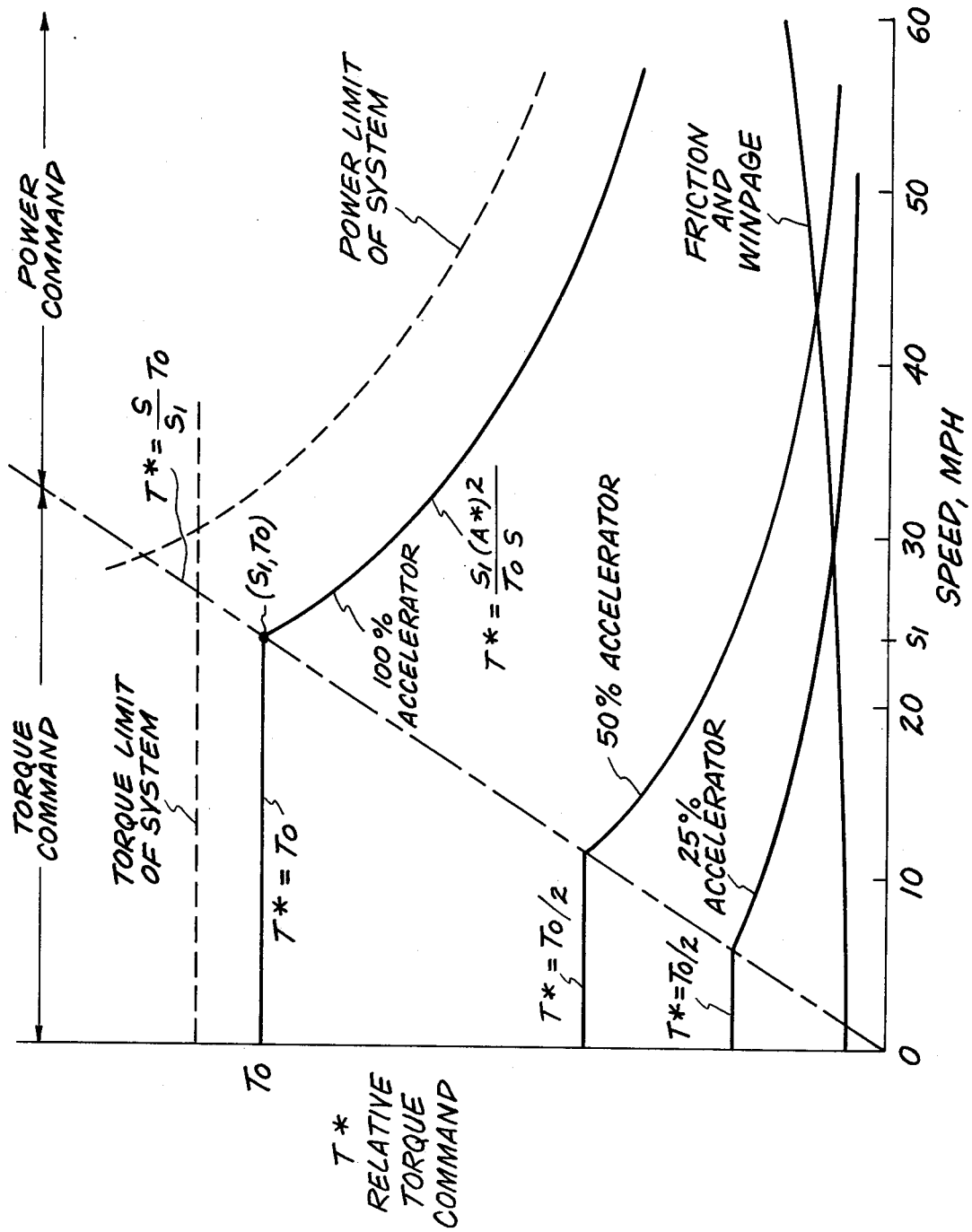

APPARATUS FOR CONTROLLING AN ELECTRICAL VEHICLE DRIVE SYSTEM

BACKGROUND OF THE INVENTION

This invention relates to an apparatus for supplying a flux and torque command to an electric vehicle drive system having as an input vehicle accelerator pedal position.

One of the many criteria in the design of electric vehicle drive systems is that the electric vehicle drive system approximate the driving chacteristics of the conventional internal combustion automobile. Specifically, the electric vehicle drive system must be capable providing smooth vehicle acceleration and deceleration in accordance with driver commands supplied to the vehicle drive system through the accelerator pedal.

Another criteria in the design of electric vehicle drive systems is that such a drive system be rugged so as not to require frequent maintenance. Further, such vehicle drive systems must be efficient to maximize vehicle range.

Configuring the electric vehicle drive system from an inverter-induction machine drive allows a rugged and efficient electric vehicle drive system to be realized. However, the inverter-induction machine drive, when controlled by conventional techniques such as torque regulation and using an optimum size inverter, exhibits a dead zone at high speeds because of the inability of the inverter-induction machine drive to supply constant torque.

It is an object of the present invention to provide an electric vehicle drive system which achieves smooth control of vehicle acceleration and deceleration at all speeds.

It is another object of the present invention to provide a balancing speed characteristic as a function of accelerator pedal position for driving at a constant speed.

It is still another object of the present invention to provide an electric vehicle drive system, responsive to operator commands as transmitted through the vehicle accelerator pedal, which approximates the driving characteristics of an internal combustion engine automobile.

BRIEF SUMMARY OF THE INVENTION

Briefly, in accordance with one of the embodiments of the present invention, an electric vehicle drive system for providing smooth control of vehicle acceleration and deceleration in accordance with operator commands transmitted through the vehicle accelerator pedal has a torque command generator that provides a torque signal proportional to accelerator pedal position and a torque signal varying to provide constant horsepower. The constant torque signal is selected by the torque command generator at low speeds and the torque signal varying to provide constant horsepower selected at higher speeds with a smooth transition from constant torque to constant horsepower occurring at lower speeds for decreasing accelerator pedal position. The torque command is coupled to a control system for a traction motor.

BRIEF SUMMARY OF THE DRAWING

The features of the invention believed to be novel are set forth with particularity in the appended claims. The invention itself, however, both as to organization and method of operation, together with further objects and advantages thereof, may best be understood with reference to the following description taken in conjunction with the accompanying drawing in which:

FIG. 3 is a graphical representation of a motor torque command versus speed characteristic as a function of vehicle accelerator pedal position.

DETAILED DESCRIPTION OF THE DRAWING

Figure 1:
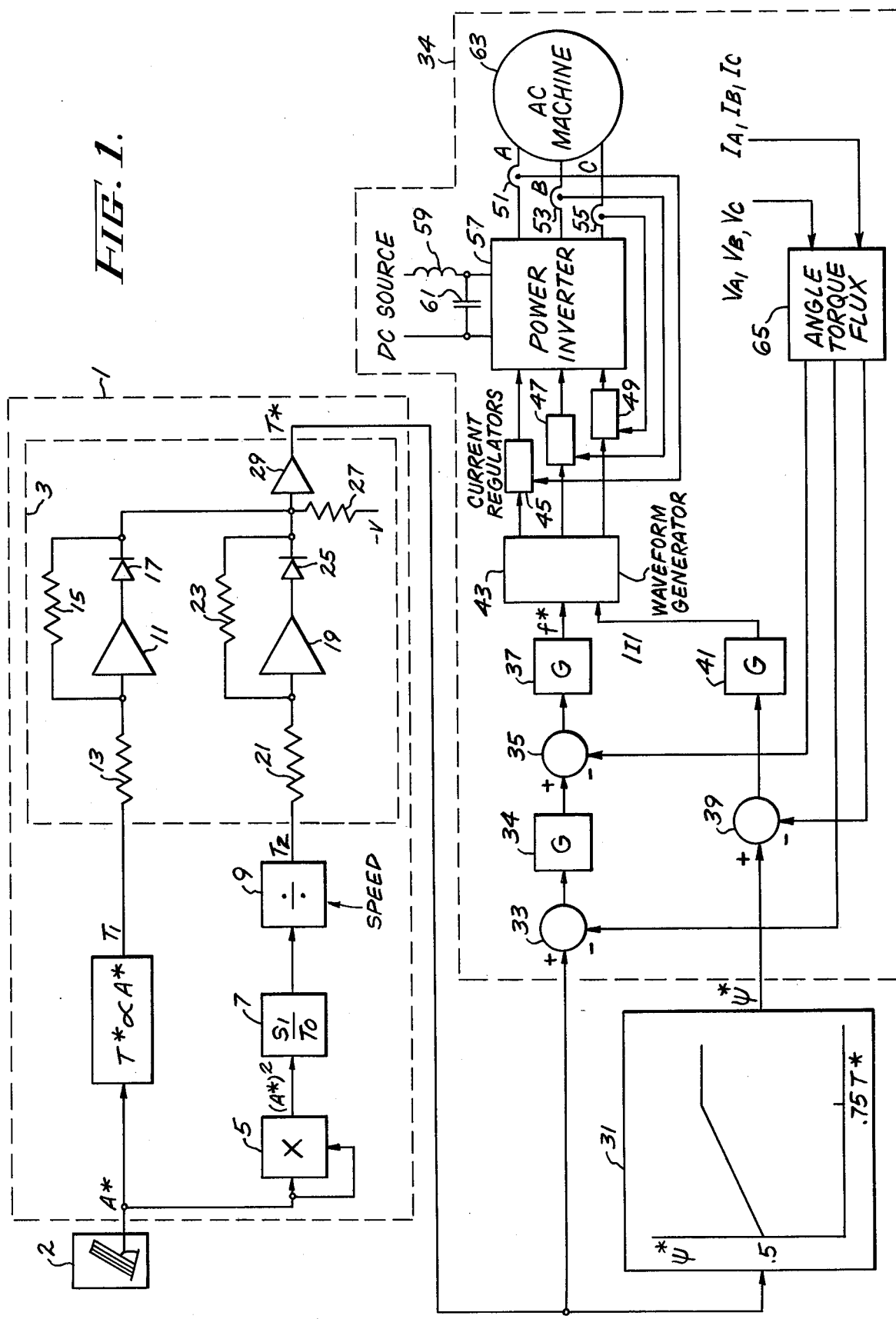
FIG. 1 is a part schematic part block diagram representation of an A.C. machine drive system suitable for use in electric vehicle.

Referring now to the drawing, wherein like reference numerals designate like elements and more particularly FIG. 1 thereof an operator command A* which can be derived from accelerator pedal position in block 2 is coupled to a torque command generator 1. The torque command generator develops two torque signals which are coupled to a minimum selector 3 within the torque command generator to develop a torque command. The torque command generator provides an operator command A* to a block 4 to develop a torque signal proportional to A* and couples to the torque signal from block 4 to one input of the minimum selector. The torque command generator also squares the operator command A* in a multiplier 5, multiplys the output of multiplier 5 by a constant $S_1/T_o$ in gain block 7 and divides the output of block 7 by a signal representative of vehicle speed S in divider 9. The output of divider 9 is connected to the other input of minimum selector 3. The minimum selector 3 has an operational amplifier 11 with the resistor 13 in series of the input of the operational amplifier and a feedback resistor 15 between the input and output of the operational amplifier. One input of the minimum selector is connected to resistor 13. The two resistors 13 and 15 are of equal value providing unity gain. A diode 17 is connected between the output of the operational amplifier 11 and feedback resistor 15 with the anode of the diode connected to the operational amplifier output. Similarly, an operational amplifier 19 has a resistor 21 in series with the operational amplifier input and a feedback resistor 23 connected between the operational amplifiers input and output. Resistors 21 and 23 are of equal value providing unity gain. A diode 25 is connected between the output of operational amplifier 19 and feedback resistor 23 with the anode of diode 25 connected to the operational amplifier output. The other input to minimum selector 3 is connected to resistor 21. The outputs of the unity gain amplifiers were coupled together and through resistor 27 to a negative power supply to provide a current sink. The outputs of the unity gain amplifiers are also connected to a signal inverter 29 to change the sign of the minimum torque signals selected as the torque command. The inversion is necessary due to the inverting action of the operational amplifiers in the minimum selector.

The torque command is connected to a flux command generator 31. The flux command generator provides a minimum flux command at all times and a maximum flux command at maximum torque command. The torque command from the minimum selector 3 and the flux command from flux generator are connected to the appropriate inputs of a control system for an A.C. machine 63.

In the embodiment of FIG. 1, a current controlled PWM control is shown. The torque command is compared to a derived torque to generate an error signal at summer 33. The output of summer 33 passes through a gain block 34 to generate an angle command signal. The angle command is compared to a motor angle signal sin $\theta$ and the difference is obtained at summer 35. The error from summer 35 passes through gain block 37 and provides a frequency command f*. The flux from generator 31 is compared to the derived machine flux in summer 39 and the error signal is sent through gain block 41 resulting in a current amplitude command $|I|$. Waveform generator 43 supplies each of three current regulators 45, 47 and 49 with one of the three sinusoidal reference signals, each of the reference signals being in a three-phase relationship with one another. The amplitude and frequency of each of the three sinusoidal signals generated by the waveform generator, varying in accordance with the frequency command and amplitude command signal input to the waveform generator. The current regulators 45, 47 and 49 in addition to having inputs from the waveform generator each have an input from current sensors 51, 53 and 55 which are connected to the output of a power inverter 57. The current regulators provide pulse width modulated signals to the inverter 57. Power is supplied to the inverter by a D.C. supply through a filter consisting of a series inductor 59 and a parallel capacitor 61. The output of the inverter which consists of three lines A, B, and C is connected to the stator winding of motor 63. Block 65 derives motor angle, torque and flux for use as feedback signals from motor voltages and currents.

Figure 2:
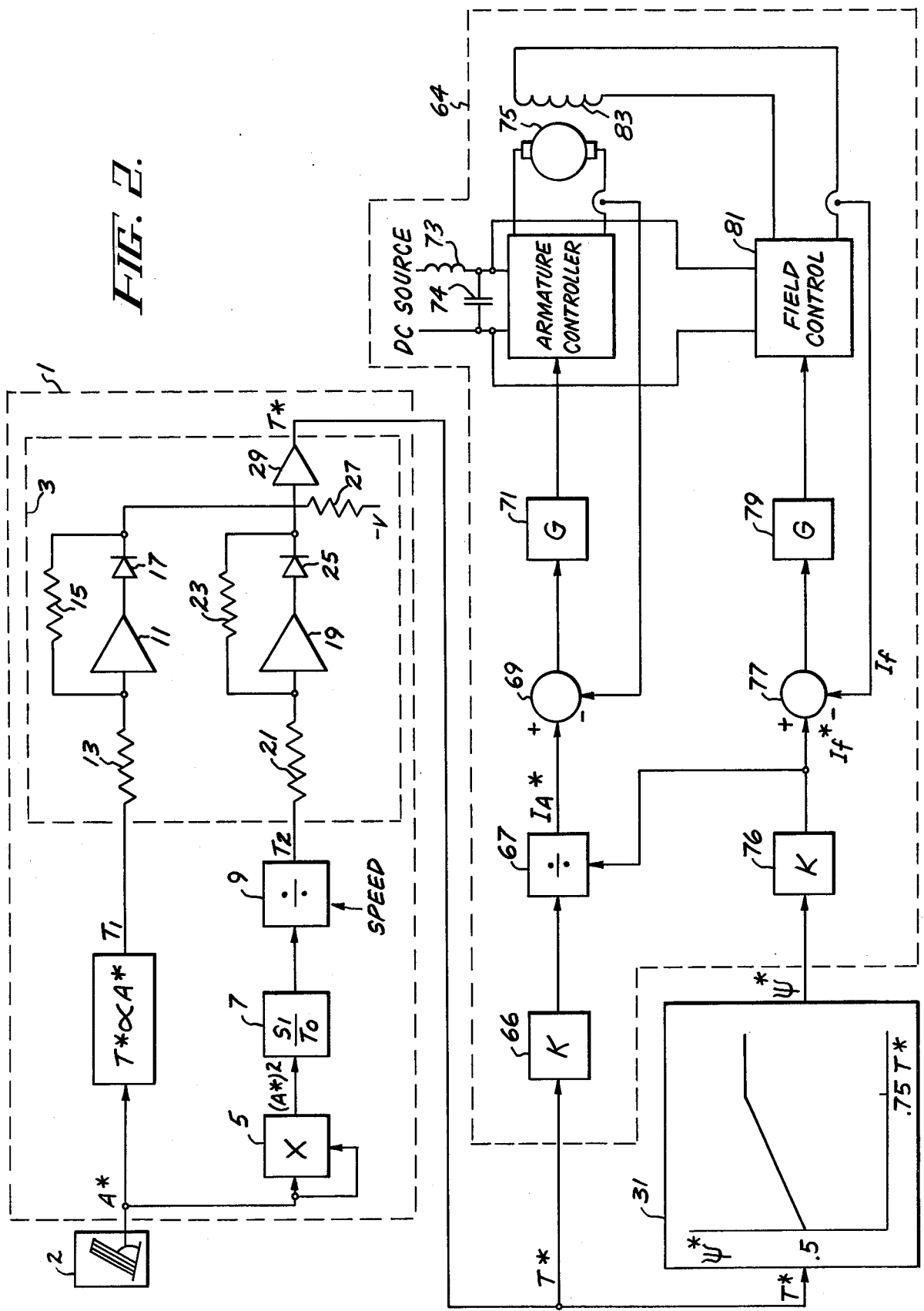
FIG. 2 is a part schematic part block diagram representation of a D.C. machine drive system suitable for use in electric vehicle.

Referring to FIG. 2, a torque command generator and a flux generator are shown connected to a control system for a D.C. machine 64. The flux command generator and torque command generator are configured as previously described. The output of the torque command generator passes through again block 66 and field current command I$_F$* in divider 67 to develop an armature current command I$_A$*. The output of the flux command generator after passing through gain block 76 is used as a field current command I$_F$* to the D.C. machine control system. The armature current command is compared actual armature current in summer 69. The error is sent to gain block 71 and then to the armature control. The armature control is supplied with power from a D.C. source through a filter consisting of series inductor 73 and a parallel capacitor 74. The output of the armature controller is connected across the armature of the D.C. motor 75. The field current command I$_F$* is compared to motor field current and the difference obtained in summer 77 is sent through gain block 79 to a field controller 81 which also receives power from the D.C. supply through a filter. The output of the field controller is conected to the field winding 83 of the motor.

The operation of FIG. 1 will now be described. The torque command generator 1 develops a torque command as a function of accelerator pedal position for different speeds. Referring to FIG. 3, the relationship between torque command and speed for different values of accelerator pedal position is shown. If a simple constant torque command was supplied to the motor control system at all speeds, the command would be ineffective at higher speeds due to the power limited nature of the inverter and the motor. Also, a natural balancing point between motor torque output and vehicle resistance at high speeds would not be clearly defined because of the shallow angle of intersection between the constant torque line and the vehicle friction and windage line. By using a constant torque command whose value varies proportionally to accelerator position at low speeds and a torque command varying to maintain constant power at high speeds dead zones at high speeds due to commanding excessive torque are eliminated. In addition, a natural balancing speed for a given accelerator pedal position is achieved giving a driving control characteristic similar to a gasoline engine powered automobile. The vehicle speed at which the transition between constant torque and torque varying to maintain constant power changes with operator command to obtain a good range of control at high speeds. The transition between constant torque command mode and the torque command varying to produce constant power mode can occur, for example, along a line passing through the origin and a point having a maximum speed at which a maximum torque at nominal battery voltage is desired. The torque T$_o$ is the maximum torque commanded at maximum accelerator pedal position. The point along the transition line where the torque command crosses is a function of accelerator pedal position. The horsepower resulting from the constant torque magnitude times the speed at the transition line crossing is the horsepower maintained as vehicle speed is increased beyond the transition line into the constant horsepower mode assuming fixed accelerator position.

The transition of voltage to frequency control in the motor control system does not have to correspond to the transition called for by the torque command from constant torque to constant power. The same torque command generator can be used with different motor controllers having different characteristics as long as the torque called for at any given speed by the torque command generator does not exceed the motor control system capabilities.

An example of the drive system maximum torque and maximum power capability is shown in FIG. 3 as dashed lines. A desirable way of matching the torque command generator to the drive system maximum capability is to make the point (Si,T$_o$) correspond to the equivalent intersection of the drive system maximum capability lines.

Assuming the vehicle is standing still and the accelerator pedal is depressed to one-half its travel distance, the constant torque signal proportional to the accelerator pedal position will be produced in block 4 of FIG. 1 and connected to one input of the minimum selector 3. The torque signal providing constant power at the current speed of the vehicle is provided at the other input of the minimum selector 3. At low speeds the constant torque signal will be selected since it is the lesser of the two torque signals. As the vehicle speed increases the constant power curve and the constant torque curve crosses at the transition line. By using the minimum selector, discontinuities in torque command are avoided. As the vehicle speed increases the constant power torque signal is selected as the torque command. If the accelerator pedal is kept at its half way position, the windage and friction curve of the vehicle intersect with the constant power curve providing a constant balancing speed.

The flux generator always provides a minimum amount of flux to avoid delay in an initial motor response. At maximum torque command, the flux command is at a maximum. At light loads the flux commanded is reduced to increase motor efficiency. The torque command generator and the flux command generator can be used with any A.C. motor control requiring a torque and flux command. The current controlled PWM control system shown is explained in greater detail in my U.S. Pat. No. 4,320,331 issued Mar. 16, 1982 (Ser. No. 80,479) entitled "Transistorized Current Controlled Pulse Width Modulated Inverter Machine Drive system", filed Oct. 1, 1979 and assigned to the General Electric Company.

The operation of the torque and flux generator of FIG. 2 is the same as that described in FIG. 1. The D.C. motor control used in FIG. 2 needs an armature current command and the field current command. Torque is proportional to field current times armature current. Therefore, the torque command after passing through gain block 66 is divided by the motor field current in divider 67 to obtain an armature current command. Field current is proportional to motor flux neglecting saturation and therefore the flux is used as a field current command after passing through gain block 76.

The torque command generator and the flux generator and the flux generator of the instant invention provide command signals in response to accelerator pedal position that achieve smooth accelerator control for an A.C. or D.C. electric vehicle, without a dead zone at high speeds. In addition, the present invention provides a balancing speed characteristic as a function of accelerator position for driving at constant speeds.

It is understood that the foregoing detailed description is given merely by way of illustration and many modifications can be made without departing from the spirit or scope of the present invention.

What is claimed is:

1. An electric vehicle drive system responsive to accelerator pedal position comprising:
    means for generating a torque command having means for generating a constant torque signal proportional to accelerator pedal position, means for generating a torque signal varying with vehicle speed to maintain constant horsepower and dependent on accelerator pedal position, and means for comparing said signals and selecting the smaller as the torque command, Whereby the transition between constant torque command and torque command producing constant horsepower occurs at lower speeds with decreasing pedal position; and
    a traction motor control system responsive to said torque command.

2. The electric vehicle drive system of claim 1 wherein said means for generating a torque signal varying with vehicle speed to maintain constant horsepower and dependent on an accelerator pedal position comprises: means for generating a signal proportional to accelerator pedal position, squaring means connected to receive said accelerator pedal signal and producing a square of said accelerator pedal signal, gain means coupled to said squaring means and producing an amplified output signal proportional to the input signal, and divider means coupled to said gain means and dividing the output signal of the gain means by a signal representative of vehicle speed to generate a torque signal.

3. The electric vehicle drive system of claim 1 further including:
    means for generating a flux command responsive to said accelerator position providing a minimum flux command greater than zero at minimum accelerator pedal position and a maximum flux command at maximum accelerator pedal position; and
    wherein said traction motor control system is further responsive to said flux command.

4. The electric vehicle drive system of claim 3 wherein said means for generating a flux command is responsive to said torque command.

5. The electric vehicle drive system of claim 4 wherein said traction motor control system is a pulse width modulated current control system for an induction motor.

* * * * *